United States Patent [19]

Fallon et al.

[11] Patent Number: 5,165,638

[45] Date of Patent: Nov. 24, 1992

[54] FURNITURE CONNECTOR FOR A TABLE

[75] Inventors: Vincent Fallon, Essex, England; Manfred Elzenbeck, Steinheim; Theodor Luptovits, Ditzingen, both of Fed. Rep. of Germany

[73] Assignee: Fröscher Aspekt GmbH Co. KG, Steinheim, Fed. Rep. of Germany

[21] Appl. No.: 707,871

[22] Filed: Jun. 3, 1991

[30] Foreign Application Priority Data

Jun. 1, 1990 [DE] Fed. Rep. of Germany ....... 4017807

[51] Int. Cl.[5] ............................................. A47B 11/00
[52] U.S. Cl. .................................. 248/188.7; 248/188
[58] Field of Search ................... 248/188.7, 188, 168, 248/151, 529; 108/115; 297/440; 403/170, 219

[56] References Cited

U.S. PATENT DOCUMENTS

| 3,877,669 | 4/1975 | Ambasz | 248/188.7 |
| 4,448,378 | 5/1984 | Binfaré | 248/188.7 |
| 4,728,067 | 3/1988 | Steinmetzer et al. | 248/188.7 |
| 4,911,391 | 3/1990 | Ellis | 248/188.7 |

FOREIGN PATENT DOCUMENTS 2342915 5/1974 Fed. Rep. of Germany ... 248/188.7

Primary Examiner—Karen J. Chotkowski
Attorney, Agent, or Firm—Edwin E. Greigg; Ronald E. Greigg

[57] ABSTRACT

A furniture connector, which comprises a bundle of segments on which construction elements, such as table legs or connecting struts are secured, and which are clamped together via two joining rings and wherein the two connecting rings are clamped together via a tie rod and wherein the segments may have various segment angles in cross section, wherein the sum of the segment angles is 360°.

25 Claims, 3 Drawing Sheets

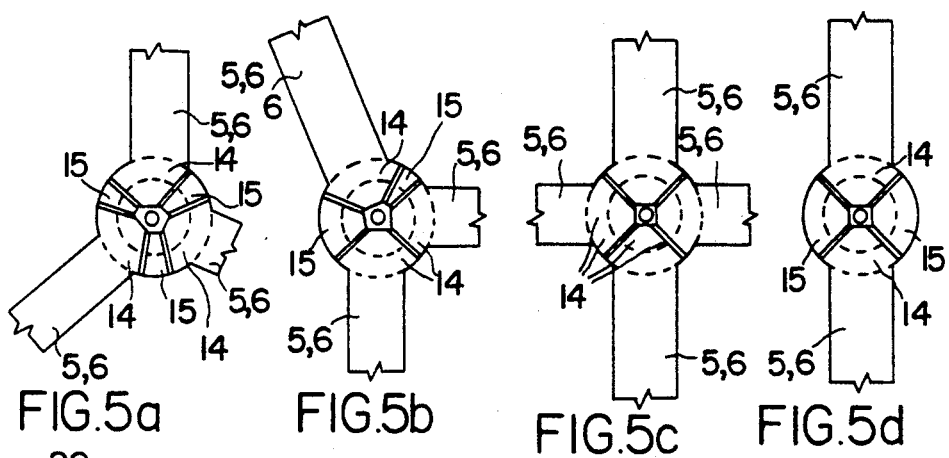
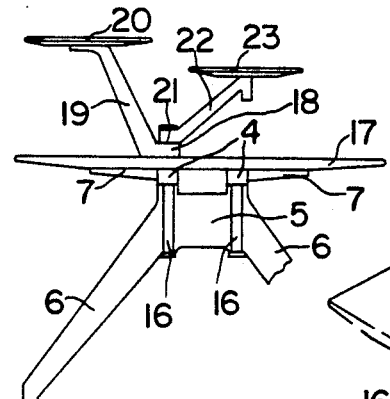
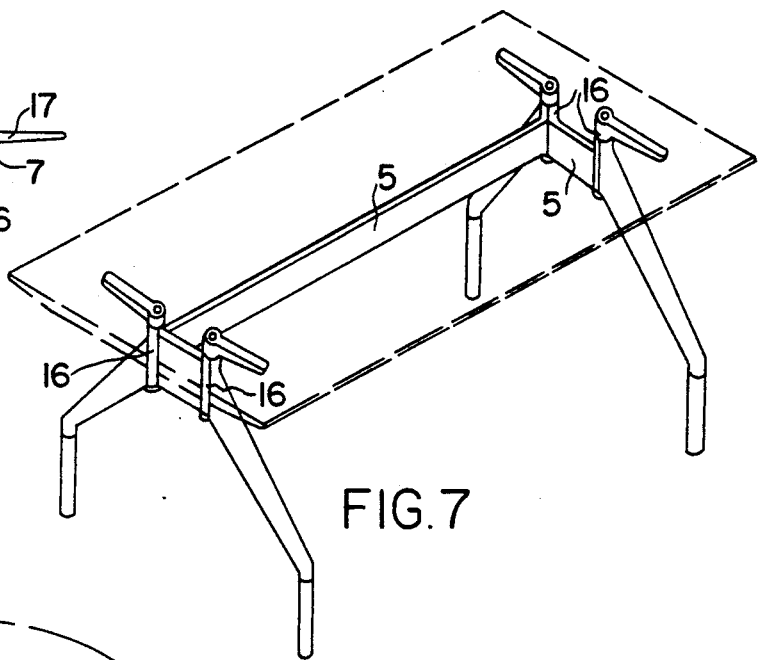
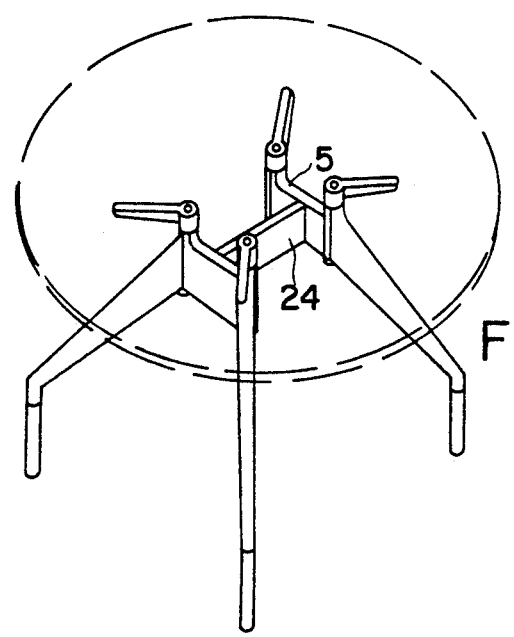

FURNITURE CONNECTOR FOR A TABLE

BACKGROUND OF THE INVENTION

The invention is based on a furniture connector for a table. Many kinds of such furniture connectors are known, and the direction of the radially branching construction elements is defined; that is, such construction elements enclose an angle of 90½, degrees for instance, and therefore a special furniture connector must be produced for any embodiment departing from such an angle.

A known furniture connector of this generic type (French Patent 2.044.122) has a bush that can be slipped onto a tubular leg, with two radially branching cantilever arms forming a right angle disposed at a right angle on the bush; furniture elements, in particular profiled tubes, can be secured to these arms. A flange is axially secured to the bush, and on the flange, a tabletop or the like can be secured in turn.

In another known furniture connector (French Patent 1.189.024), two cantilever arms likewise enclosing a right angle branch off radially, and profiled tubes can again be mounted on them in a frame construction. Once again the furniture connector can be secured to a leg, which has either a circular or rectangular cross section.

ADVANTAGES OF THE INVENTION

The furniture connector according to the invention has the advantage over the prior art that the width of the angle of the segments, or in other words the angle thereof on the central side of the cross-sectional area, can be selected from various prefabricated segments of different angles. The definitive feature is that the final bundling of the segments represents a combination in order that wobbling of the individual segments and as a result of the construction elements connected thereby is prevented. Preferably, the segment angles are selected such that they can be composed in modular form, for instance with the segment angles being 15½ degrees or a multiple thereof so as to be available thus for any combination with one another. In this way, the radially branching construction elements can be disposed at angles relative to one another that are at uniform intervals, for instance of 15½ degrees.

Another advantage of the furniture connector according to the invention is that the two joining rings lend both great strength and an attractive appearance, so that even when a number of such connectors are used for one piece of furniture, great stability is provided. Not least, it is very simple to mount such a furniture connector, because after the joining rings are slipped on, they need merely be anchored to one another, which can naturally be done in various ways.

In an advantageous feature of the invention, the ends of the segments have tangs that, when the segments are bundled, produce a circular cross section, so that each tang in itself has the area cross section of a segment of a circle (in the shape of a piece of pie), and the joining rings each have one central recess with a corresponding circular cross section. A circular cross section of this kind is advantageous because the furniture manufacturer, in selecting the various segments, need merely assure that the total number of the various angles add up to 360°, but otherwise is free in how they are combined. The segments themselves can also have any possible shape in cross section in the region of the outer jacket face, without this presenting any hindrance to the structure according to the invention of the furniture connector.

In another advantageous feature of the invention, the joining rings and the tangs of the segments are embodied such that they widen conically in the direction of the segments. In this way, the bundle of segments is pressed firmly against one another when the two joining rings are tightened counter to one another.

In another advantageous feature of the invention, at least one of the joining rings is cup-shaped, so that the bottom of the cup forms an upper closure of the furniture connector but can also serve to perform other functions, for instance acting as a bearing surface for a table top or as an engagement part for a tie rod.

In another advantageous feature of the invention, such a tie rod is embodied as a threaded bolt, which is guided centrally between the segments and is suspended preferably by its head from the bottom of one of the joining rings and on the other end, with its thread, meshes with a corresponding threaded bore of the bottom of the second joining ring. Naturally an extra threaded nut may also be provided, for example in the form of a further coaxially disposed ring with a threaded bore. The definitive feature is that the tie rod brings to bear the appropriate clamping force between the two joining rings.

In another advantageous feature of the invention, at least one of the radially branching construction elements is embodied as a furniture leg, which is correspondingly guided in the direction of the surface on which the furniture is to stand (the floor). To this end, the furniture leg is either curved or bent at an angle.

In a further feature of the invention, at least one of the radially branching construction elements is embodied as a connecting web to another furniture connector segment. Naturally, such a connecting web can also lead to a different construction element, for example a side panel of a piece of furniture, or the like. Thus this construction element may also be embodied as a cantilever arm, onto which a profiled tube serving as a connecting strut can be slipped.

In another advantageous feature of the invention, a radially projecting arm is disposed on the joining ring for supporting and securing other pieces of furniture, in particular table tops. By means of a projecting arm of this kind, tilting of the table top, above all, can be prevented if two furniture connectors are disposed relatively tightly against one another. The projecting arms persist in the established direction, since directional locking of the joining rings and thus of the cantilever arms as well is effected as a result of the clamping together of the joining rings.

In another advantageous feature of the invention, other pieces of furniture can be coupled axially via the tie rod. On the side of a table top remote from the joining ring, a support ring can be firmly clamped via such a tie rod; on this support ring, via supporting arms, other elements such as trays, lamps, vertical panels and the like can be secured. A versatile program in terms of structure above the table top is enabled in this way with the aid of the invention, this structure being firmly joined to the actual supporting system, namely the table legs and the connecting struts.

Further advantages and advantageous features of the invention can be found in the ensuing description, drawing and claims.

DRAWING

An exemplary embodiment of the subject of the invention is shown in the drawing and described in further detail in terms of a plurality of exemplary uses. Shown are:

FIG. 1, the furniture connector according to the invention in the assembled state;

FIG. 2, the furniture connector of FIG. 1 in an exploded view;

FIG. 3, the furniture connector of FIGS. 1 and 2 with bundled segments but with the joining rings as yet unattached;

FIG. 4, in the assembled state but in a partial longitudinal, section;

FIG. 5a-5d four different examples a, b, c, d of segments in cross section, with different segment angles;

FIG. 6, an exemplary use in a table with an elevated shelf;

FIGS. 7 and 8, two exemplary uses shown for a rectangular and a round table, respectively;

FIGS. 9-12, the utilization of the invention for attaching other office equipment.

DESCRIPTION OF THE EXEMPLARY EMBODIMENT OF THE INVENTION WITH EXEMPLARY USES

Figure 1:
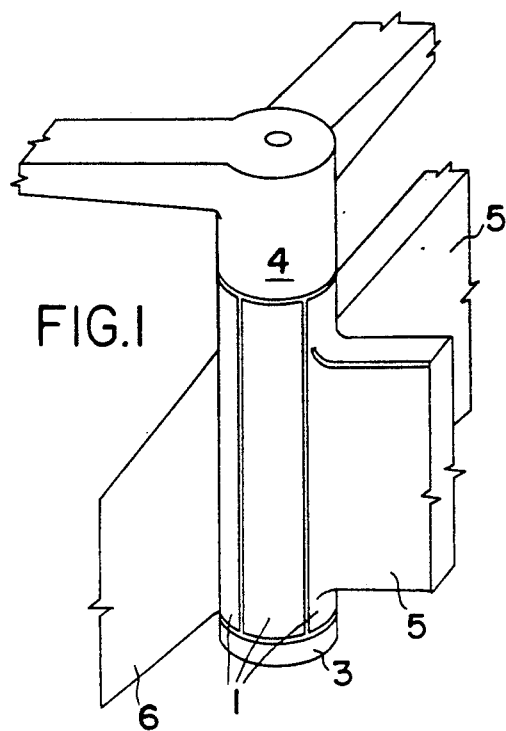
Figure 2:
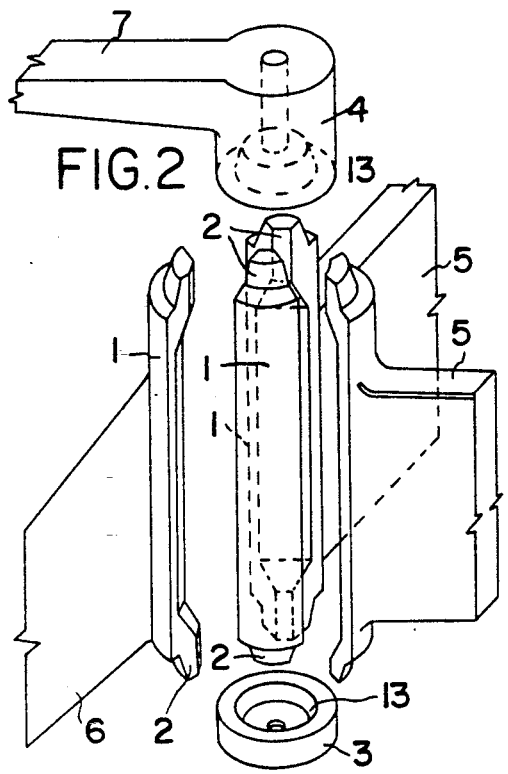
Figure 3:
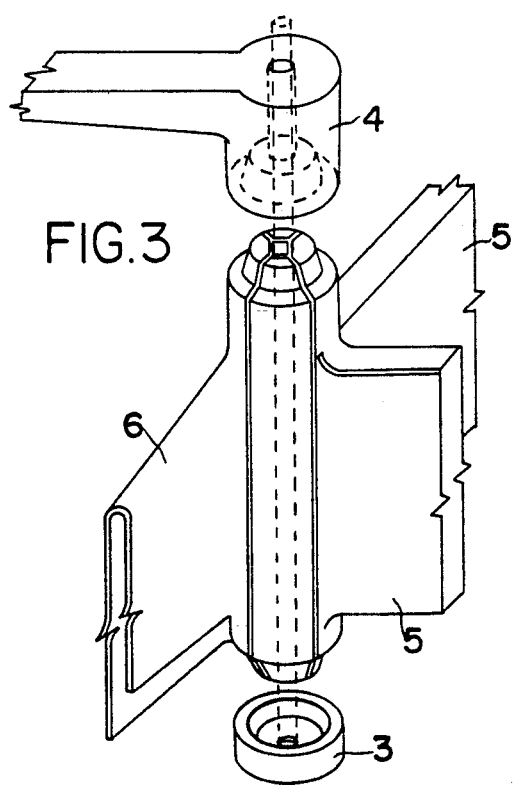
Figure 4:
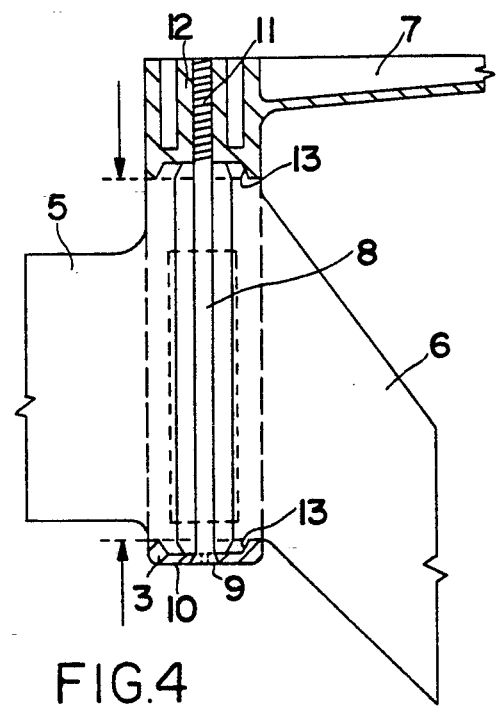

As shown in FIGS. 1-5, the furniture connector according to the invention comprises individual segments 1, which are bundled together, via joining rings 3 and 4, at their free ends which taper outward and are embodied as tangs 2. Radially branching connecting struts 5 are disposed on some of the segments 1 and extend horizontally, while a furniture leg 6 leading downward is disposed on other segments 1. While the lower joining ring 3 is embodied as a relatively flat cap fitting around the tangs 2, the upper joining ring 4 is embodied as relatively long and has a cantilever arm 7 flush with its upper plane surface. The two joining rings 3 and 4 are joined together by a threaded bolt 8 serving as a tie rod, the head 9 of which is supported on the bottom 10 of the cup-shaped joining ring 3, while its thread 11 meshes with a corresponding threaded bore of the bottom 12 of the joining ring 4. By tightening the threaded bolt 8, the central recesses 13, likewise embodied conically, of the joining rings 3 and 4 are drawn onto the conical tangs 2 of the segments 1 in such a way that a firm, form-locking connection is created between the segments 1. In the assembly, beginning with the view shown in FIG. 2, the segments 1 are first thrust together so that the bundling shown in FIG. 3 is created, after which the joining rings 3 and 4 are thrust over this from above and below and drawn together by the threaded bolt 8, resulting in the final form of the furniture connector shown in FIG. 1.

In FIG. 5, four different combinations of segments with different angles are shown. In a, three supporting segments 14 with three filler segments 15 are disposed in alternation. The supporting segments each have a segment angle of 90°, while the filler segments here have segment angles of 30° each. The sum of all the angles must be 360°, in other words in this case 3×90° plus 3×30°, thus added up to 360°. The radially branching construction elements 5 and 6 enclose an angle of 120° between them.

In example b of FIG. 5, as in all the other examples as well, the supporting segments 14 have 90° segment angles, while a filler segment 15 having a 15° segment angle and on the other side a filler segment with a 75° segment angle are disposed between two construction elements 5 and 6. Two of the supporting segments 14 also touch one another directly. The result is first that as a result of this direct contact an enclosed angle of 90° is created between the construction elements 5 and 6. The other angles enclosed by the construction elements are 105° on one side and 165° on the other. The sum of the angles is again 360°.

In example c, no filler segments at all are present; there are only supporting segments 14. Since all the supporting segments have a segment angle of 90° and are in direct contact with one another, the result is that the construction elements 5 and 6 form right angles with one another, so that in other words their axes intersect at right angles.

In example d, the filler segments 15 likewise have segment angles of 90°. Moreover, only two construction elements 5 and 6 are provided. In accordance with this disposition, the two construction elements 5 and 6 are accordingly flush with one another.

Naturally, the filler segments 15 may also have different segment angles; to achieve a simple combination, however, it is useful to keep segments 1 that have segment angles of 15°, or a multiple thereof, in inventory. The segment angle of the supporting segments 14 can naturally also be less than or greater than 90°, with the only definitive feature being that the necessary 360° angle is attained in the simplest possible combinations after bundling of the segments. For an angle of less than 360°, there is play between the segments 1, which can considerably impair the stability, for example.

In the exemplary embodiment shown in FIG. 6, a table is shown from the narrow end, having two furniture connectors 16 that are joined together via a connecting strut 5 and on each of which one table leg 6 is disposed. A table top 17 rests on the joining rings 4 or in other words on the cantilever arms 7. A supporting ring 18 is disposed above the table top 17, coaxially with the furniture connector 16; this supporting ring is either clamped to the table top 17 or the associated furniture connector 16 via the threaded bolt, not shown here, or is secured via its own threaded bolt, which engages the thread of the joining ring 4. Disposed on the supporting ring 18 is a support arm 19, on which a plate 20 is secured, to provide an additional shelf capability. Also disposed on the supporting ring 18 is a further supporting ring 21, which has a pivotable support arm 22, on which a plate 23 is secured, as a further additional shelf.

In FIGS. 7 and 8, a rectangular and a round table are shown as examples; in the rectangular table of FIG. 7, the elongated connecting strut 5 connects the two furniture connectors 16, from which short connecting struts 5 then lead to each of the other two furniture connectors 16. However, for the round table shown in FIG. 8, the two connecting struts 5 are joined together via a strip 24 that in this sense is independent of the furniture connector 16.

Figure 9:
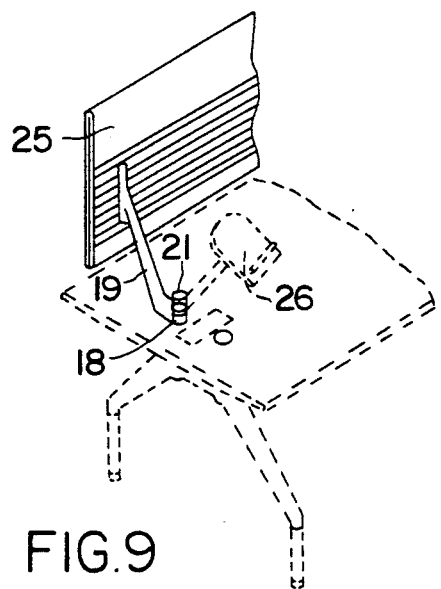

FIG. 9 shows how a vertically disposed plate 25 can be secured to such a supporting ring 18 and support arm 19. A shelf 26 can also be mounted via the second supporting ring 21.

Figure 10:
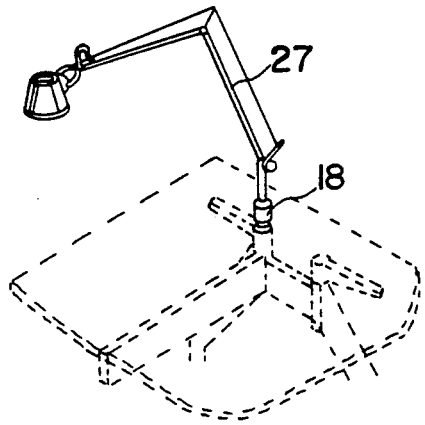

In FIG. 10, the supporting ring 18 is used to secure a desk lamp 27 to it.

Figure 11:
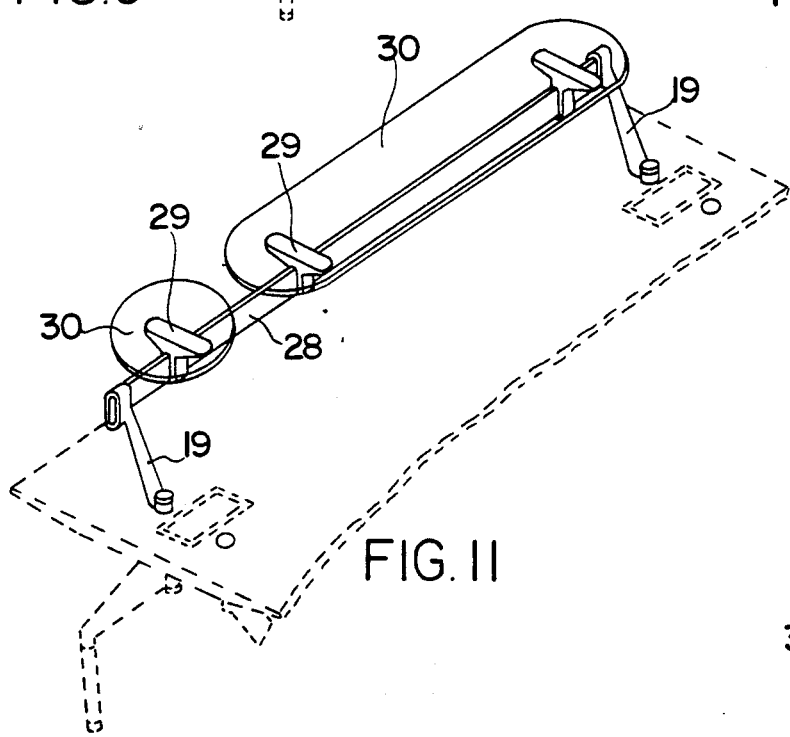

The structure in FIG. 11 is similar to that of FIG. 6, but trays 30 are supported via suitable slides 29 on a rail 28 disposed between two support arms 19.

Figure 12:
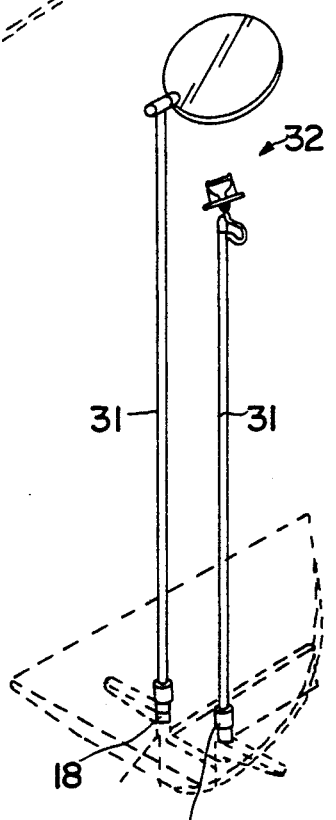

In the exemplary use shown in FIG. 12, a holder 32 is mounted on the supporting ring 18 via rods 31; in this holder, a halogen bulb, as a lamp, shines on a mirror that reflects the light back to the table.

Various materials can be used for the furniture connectors, in particular aluminum, which has a low weight per unit volume and can be fabricated with great precision.

All the characteristics in the specification and in the following claims and shown in the drawing may be essential to the invention, both individually and in any arbitrary combination with one another.

We claim:

1. A furniture connector which comprises:
   a plurality of elongated equal length segments (1) which assembled together form a connector with a total of 360 degrees in cross section of the connector;
   the segments (1) include tapered outer ends (2) which form tangs and are radially bundled together side-by-side by first and second joining rings (3, 4) that fit around the tapered outer ends (2), respectively, of the segments and the first and second rings include a central recess (13) which receives the tapered outer ends of the segments;
   the first and second joining rings (3, 4) are anchored to one another in an axial direction of the furniture connector (16) by a tie rod (8);
   one construction element (5, 6) is secured to at least one of said elongated segments (1), and
   said second joining ring (4) includes a cantilever extending perpendicular thereto.

2. A furniture connector as defined by claim 1, in which the central recess (13) of the first and second joining rings (3, 4) and the tangs of the segments (1) as embodied as widening conically in an axial direction toward the segments.

3. A furniture connector as defined by claim 2, in which at least one of the first and second joining rings (3, 4) is embodied as cup-shaped.

4. A furniture connector as defined by claim 2, in which at least one of the radially branching construction elements is embodied as a connecting strut (5) which is connected at one end to another furniture connector segment (16).

5. A furniture connector as defined by claim 2, in which a radially projecting arm (7) for supporting and securing other parts of furniture, in particular a table top, is disposed on the joining ring (4).

6. A furniture connector as defined by claim 2, in which further furniture parts can be coupled in the axial direction by the tie rod (8).

7. A furniture connector as defined by claim 1, in which at least one of the first and second joining rings (3, 4) is embodied as cup-shaped.

8. A furniture connector as defined by claim 7, in which at least one of the radially branching construction elements is embodied as a connecting strut (5) which is connected at one end to another furniture connector segment (16).

9. A furniture connector as defined by claim 7, in which a radially projecting arm (7) for supporting and securing other parts of furniture, in particular a table top, is disposed on the joining ring (4).

10. A furniture connector as defined by claim 7, in which a threaded bore (11) for the tie rod (8) is present in the bottom of the cup of the second joining ring (4).

11. A furniture connector as defined by claim 10, in which further furniture parts can be coupled in the axial direction by the tie rod (8).

12. A furniture connector as defined by claim 11, in which a further supporting ring (21) can be secured coaxially to a supporting ring (18) secured above a table top, and other furniture elements can likewise be disposed on said support ring.

13. A furniture connector as defined by claim 1, in which the tie rod is embodied as a threaded bolt (8).

14. A furniture connector as defined by claim 13, in which a threaded bore (11) for the tie rod (8) is present in the bottom of the cup of the second joining ring (4).

15. A furniture connector as defined by claim 13, in which further furniture parts can be coupled in the axial direction by the tie rod (8).

16. A furniture connector as defined by claim 1, in which a threaded bore (11) for the tie rod (8) is present in the bottom of the cup of the second joining ring (4).

17. A furniture connector as defined by claim 1, in which at least one of the radially branching construction elements is embodied as a furniture leg (6), which is extended correspondingly in a direction of a surface on which the furniture is to stand.

18. A furniture connector as defined by claim 17, in which further furniture parts can be coupled in the axial direction by the tie rod (8).

19. A furniture connector as defined by claim 1, in which at least one of the radially branching construction elements is embodied as a connecting strut (5) which is connected at one end to another furniture connector segment (16).

20. A furniture connector as defined by claim 19, in which further furniture parts can be coupled in the axial direction by the tie rod (8).

21. A furniture connector as defined by claim 1, in which further furniture parts can be coupled in the axial direction by the tie rod (8).

22. A furniture connector as defined by claim 21, in which a supporting ring (18) can be firmly clamped via the tie rod (8) on an upper side of a table top (17) remote from the joining ring (4), upon which supporting ring (18) other furniture elements (tray 20, 23; lamp 27, 32; vertical panel 25, and so forth) can be secured via support arms (19).

23. A furniture connector as defined by claim 22, in which a further supporting ring (21) can be secured coaxially to the supporting ring (18), and other furniture elements can likewise be disposed on said further supporting ring (21).

24. A furniture connector as defined by claim 1, in which a radially projecting arm (7) for supporting and securing other parts of furniture, in particular a table top, is disposed on the joining ring (4).

25. A furniture connector as defined by claim 24, in which further furniture pars can be coupled in the axial direction by the tie rod (8).

* * * * *